(12) United States Patent
Huang et al.

(10) Patent No.: US 12,120,613 B2
(45) Date of Patent: Oct. 15, 2024

(54) METHODS, APPARATUS AND SYSTEMS FOR DATA TRANSMISSION IN A POWER EFFICIENT STATE

(71) Applicant: ZTE CORPORATION, Guangdong (CN)

(72) Inventors: He Huang, Guangdong (CN); Jianxun Ai, Guangdong (CN); Yuan Gao, Guangdong (CN)

(73) Assignee: ZTE CORPORATION, Guangdong (CN)

(*) Notice: Subject to any disclaimer, the term of this patent is extended or adjusted under 35 U.S.C. 154(b) by 531 days.

(21) Appl. No.: 17/363,788

(22) Filed: Jun. 30, 2021

(65) Prior Publication Data

US 2021/0329559 A1   Oct. 21, 2021

Related U.S. Application Data

(63) Continuation of application No. PCT/CN2019/070410, filed on Jan. 4, 2019.

(51) Int. Cl.
*H04W 52/02* (2009.01)
*H04W 72/23* (2023.01)
*H04W 76/27* (2018.01)
*H04W 76/28* (2018.01)
*H04W 74/0833* (2024.01)

(52) U.S. Cl.
CPC ....... *H04W 52/0235* (2013.01); *H04W 72/23* (2023.01); *H04W 76/27* (2018.02); *H04W 76/28* (2018.02); *H04W 74/0833* (2013.01)

(58) Field of Classification Search
CPC ............ H04W 52/0235; H04W 72/23; H04W 72/1268; H04W 76/27; H04W 76/28; H04W 74/0833; H04W 74/006; H04W 28/0278; Y02D 30/70
See application file for complete search history.

(56) References Cited

U.S. PATENT DOCUMENTS

| 2012/0281566 | A1 | 11/2012 | Pelletier | |
| 2018/0139778 | A1* | 5/2018 | Chou | H04W 74/04 |
| 2018/0206262 | A1* | 7/2018 | Cao | H04W 72/1268 |
| 2018/0376422 | A1 | 12/2018 | Shu | |
| 2020/0037345 | A1* | 1/2020 | Ryoo | H04W 74/0833 |
| 2020/0383137 | A1* | 12/2020 | Song | H04W 74/0833 |

FOREIGN PATENT DOCUMENTS

| CN | 107889274 A | 4/2018 |
| CN | 108924829 A | 11/2018 |
| CN | 108924964 A | 11/2018 |
| WO | 2018086600 A1 | 5/2018 |

OTHER PUBLICATIONS

CATT, "Views on the Study of UE Power Saving and Wakeup Mechanism", 3GPP TSG-RAN #80, RP-180922, La Jolla, Jun. 11-14, 2018, 2 pages.

* cited by examiner

*Primary Examiner* — Farid Seyedvosoghi
(74) *Attorney, Agent, or Firm* — Duane Morris LLP

(57) ABSTRACT

Methods, apparatus and systems for transmitting data in a power efficient sate are disclosed. In one embodiment, a method performed by a wireless communication device is disclosed. The method comprises: entering a power efficient state; and transmitting, to a wireless communication node, uplink data while being in the power efficient state.

20 Claims, 8 Drawing Sheets

METHODS, APPARATUS AND SYSTEMS FOR DATA TRANSMISSION IN A POWER EFFICIENT STATE

TECHNICAL FIELD

The disclosure relates generally to wireless communications and, more particularly, to methods, apparatus and systems for transmitting data in a power efficient sate in a wireless communication.

BACKGROUND

Nowadays, a device can be installed and activated at a street corner to have a camera, some on board processing capability, and the ability to send information to authorities. The device may periodically send a small amount of information to the authorities to indicate conditions are normal. When the device detects an abnormal incident, it sends a high quality video to the authorities. In a similar manner, smartphones may have an application to frequently exchange a small amount of data with the server side of the application. A larger amount of data is needed only when e.g. a user is interested in it. These devices may be called "devices with variable data", where a large amount of data transmission is expected to happen only occasionally but nevertheless the network needs to support it.

In a fifth-generation (5G) new radio (NR) network, each terminal or user equipment (UE) can have various radio resource control (RRC) states (such as RRC_CONNECTED state, RRC_IDLE state, and RRC_INACTIVE state). For example, the RRC_INACTIVE state has been introduced to provide a power efficient state with control plane latency. For the services mentioned for "devices with variable data", since the devices need to report something unusual is detected, a short CP latency is required. Considering its power consumption, the device or UE should be configured in the RRC_INACTIVE state. Besides the video transmission in an unusual case, the device will perform small data transmissions periodically. However, for a UE in RRC_INACTIVE state in an existing network, whenever the UE has small data to transmit, the UE has to enter RRC_CONNECTED state first and then initiate the data transmission, which causes considerable signaling consumption and cannot support efficient signaling mechanisms.

Thus, existing systems and methods for handling data transmissions in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: entering a power efficient state; and transmitting, to a wireless communication node, uplink data while being in the power efficient state.

In a further embodiment, a method performed by a wireless communication node is disclosed. The method comprises: receiving, from a wireless communication device, uplink data while the wireless communication device is in a power efficient state.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
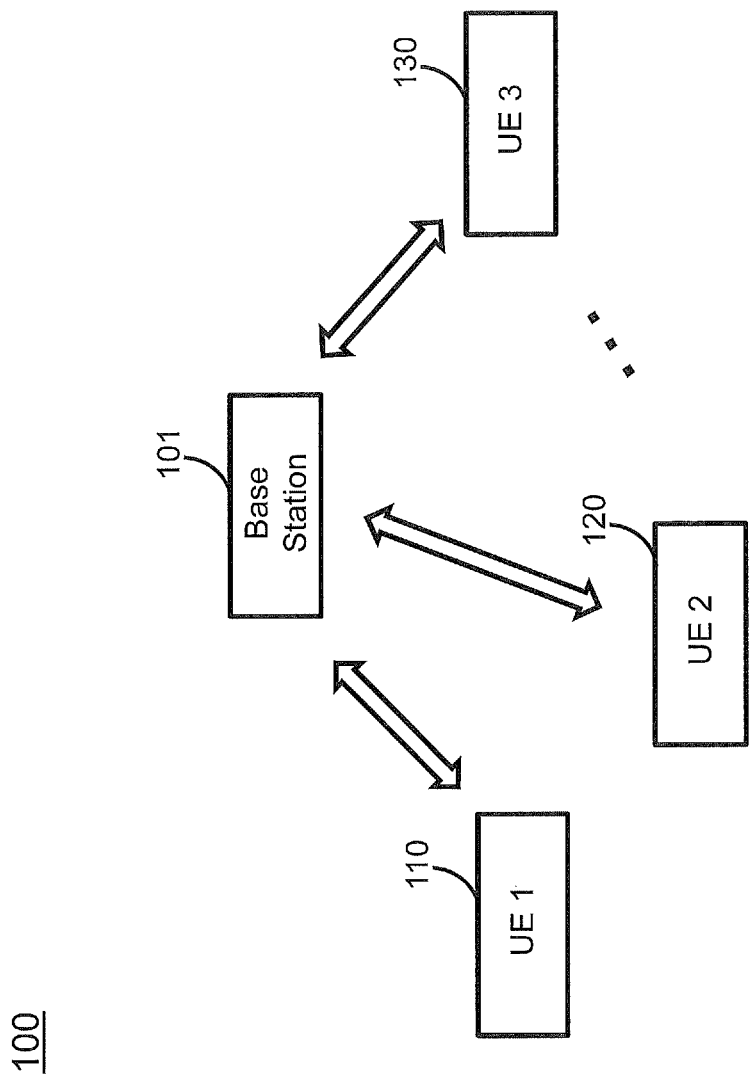
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. As sensors and monitoring devices are deployed more extensively, there will be a need to support devices that send data packages having sizes ranging from a few bits for a status update to large data like streaming video. The network should have the flexibility to provide efficient service to the device, regardless when it sends data and regardless how much data is sent in a given transmission. The network should be efficient for both frequent and infrequent short data bursts as well as large amounts of data (e.g. video data) since having two separate modems on one device for two technologies increases device complexity.

According to various requirements, a 5G system should be efficient and flexible for both low throughput short data bursts and high throughput data transmissions (e.g., streaming video) from the same device; should support efficient signaling mechanisms (e.g., signaling is less than payload); and should reduce signaling overhead for security needed for short data burst transmission, without reducing the security protection provided previous systems. In order to provide better support to the devices with various data and achieve the requirements identified above, the present teaching discloses systems and methods for a data transmission in a power efficient state without state transition. The power efficient state can be either a RRC_INACTIVE state, a RRC_IDLE state, or another state in which the UE is not required to monitor physical downlink control channel (PDCCH) based on cell radio network temporary identifier (C-RNTI) and/or not required to maintain the uplink (UL) synchronization, unless for the state transition.

Specifically, to support short data bursts, the disclosed system has the ability to operate in a connectionless mode where there is no need to establish and teardown connections when small amounts of data are sent. The disclosed system will therefore accept data transmission without a lengthy and signaling intensive bearer establishment and authentication procedure. As a result, the system will avoid both a negative impact to battery life for the device and using more signaling resources than actual data transport resources. The same device may establish a connection when it needs to transmit a large amount of data (e.g., video).

Considering a UE in a power efficient state does not have UL synchronization, normal physical uplink control channel (PUSCH) transmission, including grant free transmission, cannot be used directly by the UE in a RRC_INACTIVE state or a RRC_IDLE state. To initiate the UL data transmission in a power efficient state, a random access channel (RACH) process or a process similar to RACH can be used. That is, the UL data transmission in a RRC_INACTIVE state should be initiated by the RACH or RACH-similar process.

In one embodiment, for data transmission in a power efficient state without state transition, the following can be performed. First, the UE receives a configuration for "data transmission in power efficient state without state transition" from the network side through either system information and/or a RRC dedicated signaling. Second, once the UE in the power efficient state has data to transmit, the UE initiates the RACH procedure or grant free transmission and includes the data packet in a payload of the RACH procedure or grant free transmission for transmitting the uplink data packet.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. Each UE may enter a power efficient state in which the UE has no uplink synchronization. When the UE determines that it has some data to transmit during the power efficient state, the UE may initiate a process to access an application or service via the network 100, and transmit uplink data to the BS 101 while the UE is still in the power efficient state without any state transition.

Figure 2:
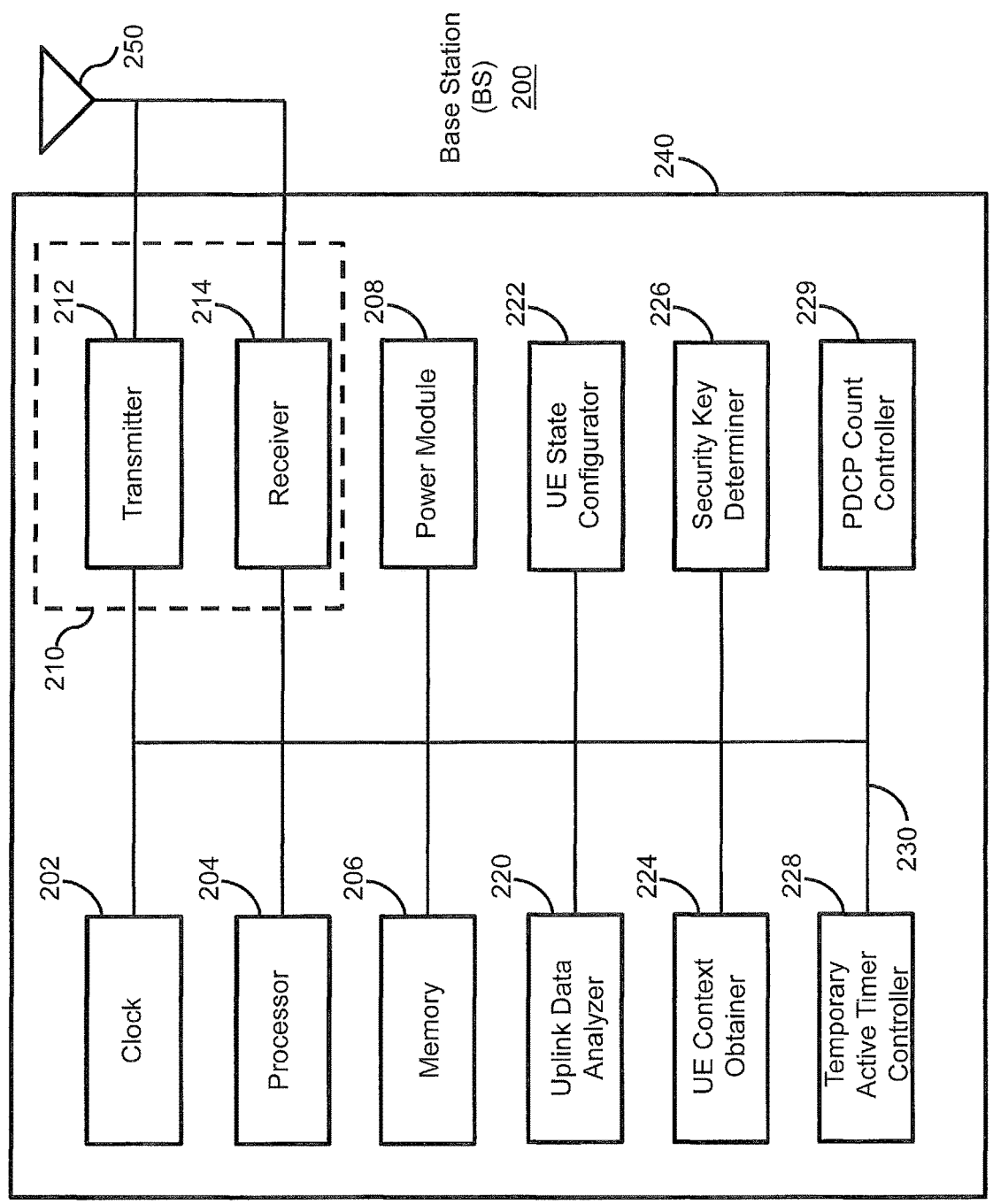
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, an uplink data analyzer 220, a UE state configurator 222, a UE context obtainer 224, a security key determiner 226, a temporary active timer controller 228, and a packet data convergence protocol (PDCP) count controller 229.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may receive data from a UE when the UE is in a connected state or a power efficient state. For example, the uplink data analyzer 220 in this example can receive, via the receiver 214 from a UE, uplink data while the UE is in a power efficient state. According to various embodiments, the power efficient state may be at least one of: an inactive state; an idle state; a state in which the UE does not maintain an uplink synchronization; and a state in which the UE does not monitor a physical downlink control channel (PDCCH) based on a cell radio network temporary identifier (C-RNTI).

In one embodiment, the uplink data analyzer 220 analyzes the uplink data received based on at least one of: a grant free transmission; and a payload of a random access process to the BS 200. The payload may refer to at least one of: a payload transmitted after a preamble in a first step of a 2-step random access channel (RACH) process; a medium access control (MAC) protocol data unit (PDU) transmitted in a message in a third step of a 4-step RACH process; a payload transmitted after a preamble in a process similar to RACH; and a payload transmitted together with a demodulation reference signal (DMRS). The payload may comprise information related to at least one of: an identification (ID) of the UE; at least one data packet of the uplink data; a buffer status report (BSR); a power headroom report (PHR); a flag indicating a reason of the random access process; a flag indicating whether the random access process is initiated for data transmission without state transition; a radio resource control (RRC) message; and a data packet included in the RRC message. The uplink data may be included in at least one of: a medium access control (MAC) service data unit (SDU) for which a MAC sub-header is allocated to indicate a logical channel to which the uplink data belongs; and at least one radio resource control (RRC) message that serves as at least one of: a bit string, an octet string, and a container.

The UE state configurator 222 in this example generates and transmits, via the transmitter 212 to the UE, configuration information related to the power efficient state, through at least one of: system information and a dedicated radio resource control (RRC) signaling. The configuration information comprises information related to at least one of: configuration for random access resources; configuration for grant free transmission; an indicator indicating whether data transmission in the power efficient state is supported and/or allowed; configuration, for an area scope including a plurality of cells, regarding whether data transmission in the power efficient state is supported and/or allowed in each of the plurality of cells; and configuration related to a selection between data transmission after state transition and data transmission in the power efficient state without state transition.

In one embodiment, the UE state configurator 222 configures that data transmission in the power efficient state without state transition is allowed based on at least one of: a first indicator in system information to indicate whether data transmission in the power efficient state without state transition is allowed in a cell; a second indicator in a dedicated signaling to indicate a cell list including at least one cell in which data transmission in the power efficient state without state transition is allowed; a third indicator to indicate whether data transmission in the power efficient state without state transition is allowed in a public land mobile network; a fourth indicator to indicate whether data transmission in the power efficient state without state transition is allowed in a tracking area; a fifth indicator to indicate whether data transmission in the power efficient state without state transition is allowed in a radio access network (RAN) notification area; a plurality of indicators each of which corresponds to one of a plurality of cells in an area scope, wherein each of the plurality of indicators indicates whether data transmission in the power efficient state is allowed in a corresponding cell; a separate indicator related to the power efficient state; and a common indicator related to a plurality of power efficient states comprising the power efficient state.

In one embodiment, the UE state configurator 222 may determine to keep the UE in the power efficient state during transmission of the uplink data based on at least one of: a buffer size of the uplink data is less than a threshold; the uplink data is related to a type of service for which data transmission in the power efficient state without state transition is allowed or not allowed, wherein the type of service refers to at least one of: a logical channel, a logical channel group, a protocol data unit (PDU) session, or a quality of service (QoS) flow; a total buffer size of data related to at least one type of service for which the data transmission without state transition is allowed is less than a threshold; and an indication to the UE. In another embodiment, the BS 200 provides parameters to the UE for the UE to make a decision on whether maintaining in the power efficient state during transmission of the uplink data.

In one embodiment, the UE context obtainer 224 determines that there is no context of the UE at a medium access control (MAC) layer of the BS 200 or there is no context at a DU of the BS 200. The UE context obtainer 224 may then perform at least one of the following operations on the uplink data: buffering the uplink data and sending an indication to a higher layer, buffering the uplink data and sending an indication to the UE, discarding the uplink data, and forwarding the uplink data to a different node that has the context of the UE. In one embodiment, "no context" means that no UE context can be identified or found based on the UE ID received from the UE together with the data.

In another embodiment, the UE context obtainer 224 determines that there is no context of the UE at a medium access control (MAC) layer of the BS 200 that serves as a distributed unit (DU) for a central unit (CU). The UE context obtainer 224 may then perform at least one of the following operations on the uplink data: transmitting a message to the CU to request the context of the UE, and buffering the uplink data until the context is established; and forwarding the uplink data to the CU through a common tunnel that is not specific to the UE.

In one embodiment, the uplink data is received based on a key for security protection of the uplink data. The security key determiner 226 may determine what the key is. For example, the security key determiner 226 may determine that the key is the same as a key that was used by the UE before entering the power efficient state.

In one embodiment, the uplink data is received based on a first key for security protection of the uplink data. The security key determiner 226 may determine that the first key is different from a second key that was used by the UE before entering the power efficient state. The first key may be used after at least one of: a downlink (DL) dedicated control channel (DCCH) message that triggers a state transition, an uplink (UL) common control channel (CCCH) message that requests a state transition, a UL DCCH message that requests a state transition, any one DL DCCH message, any one UL CCCH message, an indicator in a packet data convergence protocol (PDCP) header indicating usage of the first key, and an indicator in a radio resource control (RRC) message indicating usage of the first key.

In one embodiment, the uplink data analyzer 220 may receive and analyze, from the UE, additional data while the UE is in a time period that is referred to as a temporary time period. The UE in the temporary time period monitors a physical downlink control channel (PDCCH) with an identification (ID) of the UE without state transition at a radio resource control (RRC) layer. The temporary active timer controller 228 can control and/or determine a length of the temporary time period based on a timer. The timer is configured based on at least one of: system information; a dedicated RRC signaling; a message in a second step of a 2-step random access channel (RACH) process; a message and/or MAC control element (MAC CE) and/or downlink control information (DCI) in a second step of a 4-step RACH process; and a message and/or MAC CE and/or DCI in a fourth step of a 4-step RACH process. For example, the timer may be started in response to at least one of: a first reception by the UE of the message in the second step of the 2-step RACH process, a second reception by the UE of the message in the fourth step of the 4-step RACH process, a first offset after the first reception, and a second offset after the second reception. The timer may be restarted upon a reception by the UE of the PDCCH with the ID of the UE. The UE will exit from the temporary time period in response to an expiration of the timer.

The PDCP count controller 229 in this example instructs the UE to maintain a same packet data convergence protocol (PDCP) count value during the power efficient state based on at least one of: a first indicator in system information to indicate whether the PDCP count value shall be reset or not; and a second indicator in a dedicated RRC message to indicate whether the PDCP count value shall be reset or not. In an alternative solution, the UE may keep the PDCP count value unless the state transition is triggered and/or initialized. In another alternative solution, the UE may keep the PDCP count value once the data transmission without state transition is used.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the uplink data analyzer 220. Conversely, each of the modules illustrated in FIG. 2 can be implemented using a plurality of separate components or elements.

Figure 3:
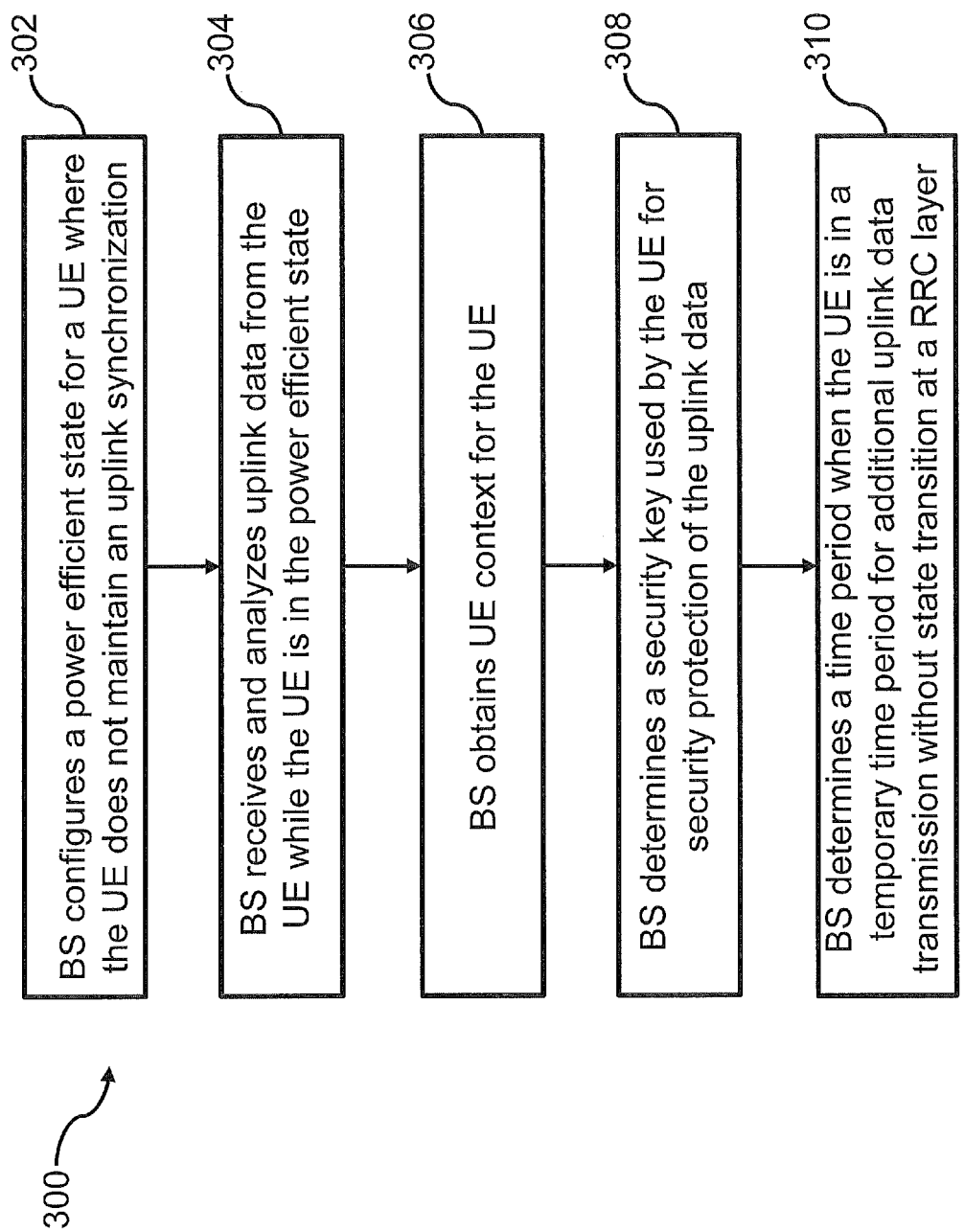
FIG. 3 illustrates a flow chart for a method performed by a BS for data transmission in a power efficient state, in accordance with some embodiments of the present disclosure.

FIG. 3 illustrates a flow chart for a method 300 performed by a BS, e.g. the BS 200 in FIG. 2, for data transmission in a power efficient state, in accordance with some embodiments of the present disclosure. At operation 302, the BS configures a power efficient state for a UE where the UE does not need to maintain an uplink synchronization. At operation 304, the BS receives and analyzes uplink data from the UE while the UE is in the power efficient state. The BS optionally obtains at operation 306 UE context for the UE when UE context does not exist at the BS. At operation 308, the BS determines a security key used by the UE for security protection of the uplink data. At operation 310, the BS determines a time period when the UE is in a temporary time period for additional uplink data transmission without state transition at a RRC layer. The order of the steps shown in FIG. 3 may be changed according to different embodiments of the present disclosure.

Figure 4:
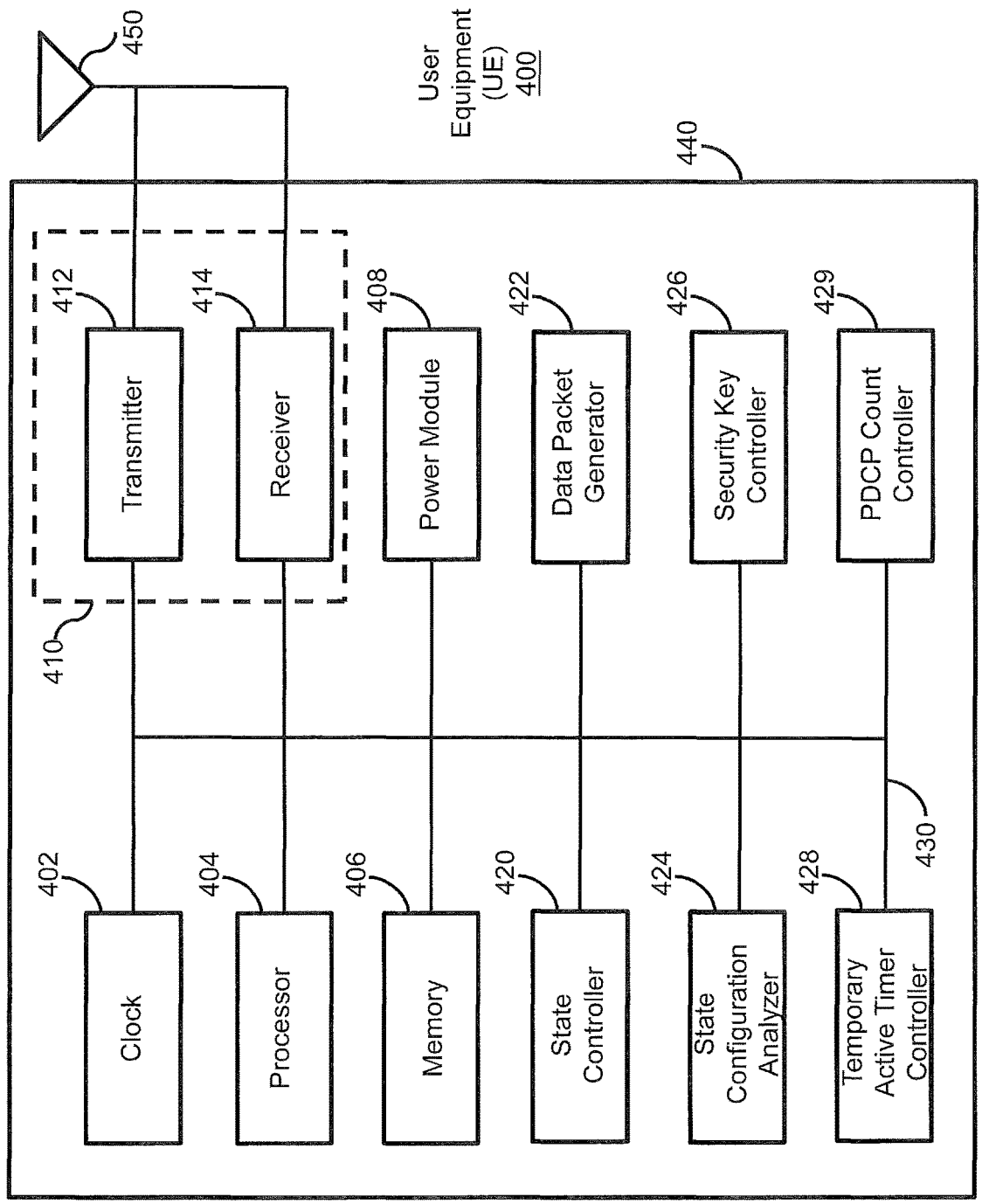
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a state controller 420, a data packet generator 422, a state configuration analyzer 424, a security key controller 426, a temporary active timer controller 428, and a PDCP count controller 429.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The state controller 420 in this example may control the UE 400 to enter a power efficient state. According to various embodiments, the power efficient state may be at least one of: an inactive state; an idle state; a state in which the UE 400 does not maintain an uplink synchronization; and a state in which the UE 400 does not monitor a physical downlink control channel (PDCCH) based on a cell radio network temporary identifier (C-RNTI).

The data packet generator 422 in this example generates and transmits, via the transmitter 412 to a BS, uplink data while the UE is in the power efficient state. The uplink data may be transmitted based on at least one of: a grant free transmission; and a payload of a random access process to the BS. The payload may refer to at least one of: a payload transmitted after a preamble in a first step of a 2-step random access channel (RACH) process; a medium access control (MAC) protocol data unit (PDU) transmitted in a message in a third step of a 4-step RACH process; a payload transmitted after a preamble in a process similar to RACH; and a payload transmitted together with a demodulation reference signal (DMRS). The payload may comprise information related to at least one of: an identification (ID) of the UE; at least one data packet of the uplink data; a buffer status report (BSR); a power headroom report (PHR); a flag indicating a reason of the random access process; a flag indicating whether the random access process is initiated for data transmission without state transition; a radio resource control (RRC) message; and a data packet included in the RRC message. In one embodiment, the uplink data is included in at least one of: a medium access control (MAC) service data unit (SDU) for which a MAC sub-header is allocated to indicate a logical channel to which the uplink data belongs; and at least one radio resource control (RRC) message that serves as at least one of: a bit string, an octet string, and a container.

The state configuration analyzer 424 in this example receives, from the BS, configuration information related to the power efficient state, through at least one of: system information and a dedicated radio resource control (RRC) signaling. The state configuration analyzer 424 may analyze the configuration information to determine that it comprise information related to at least one of: configuration for random access resources; configuration for grant free transmission; an indicator indicating whether data transmission in the power efficient state is supported and/or allowed; configuration, for an area scope including a plurality of cells, regarding whether data transmission in the power efficient state is supported and/or allowed in each of the plurality of cells; and configuration related to a selection between data transmission after state transition and data transmission in the power efficient state without state transition.

The state configuration analyzer 424 may send the analyzed information to the state controller 420 for controlling the state of the UE. In one example, the state controller 420 may determine that data transmission in the power efficient state without state transition is allowed based on at least one of: a first indicator in system information to indicate whether data transmission in the power efficient state without state transition is allowed in a cell; a second indicator in a dedicated signaling to indicate a cell list including at least one cell in which data transmission in the power efficient state without state transition is allowed; a third indicator to indicate whether data transmission in the power efficient state without state transition is allowed in a public land mobile network; a fourth indicator to indicate whether data transmission in the power efficient state without state transition is allowed in a tracking area; a fifth indicator to indicate whether data transmission in the power efficient state without state transition is allowed in a radio access network (RAN) notification area; and a plurality of indicators each of which corresponds to one of a plurality of cells in an area scope, wherein each of the plurality of indicators indicates whether data transmission in the power efficient state is allowed in a corresponding cell.

In another example, the state controller 420 may determine that data transmission in the power efficient state without state transition is allowed based on at least one of: a separate indicator related to the power efficient state; and a common indicator related to a plurality of power efficient states comprising the power efficient state. In yet another example, the state controller 420 may determine to maintain the UE 400 in the power efficient state while transmitting the uplink data based on at least one of: a buffer size of the uplink data is less than a threshold; the uplink data is related to a type of service for which data transmission in the power efficient state without state transition is allowed or not allowed, wherein the type of service refers to at least one of: a logical channel, a logical channel group, a protocol data unit (PDU) session, or a quality of service (QoS) flow; a total buffer size of data related to at least one type of service for which the data transmission without state transition is allowed is less than a threshold; and an indication from the BS.

In one embodiment, the uplink data is transmitted based on a key for security protection of the uplink data. The security key controller 426 can determine whether to generate a new key or continue using the old key for the uplink transmission. The security key controller 426 in this example may generate the key. For example, the key may be the same as a previously generated key that was used by the UE before entering the power efficient state.

In one embodiment, the uplink data is transmitted based on a first key for security protection of the uplink data. The security key controller 426 in this example may generate the first key. For example, the first key may be different from a second key that was used by the UE before entering the power efficient state. The first key may be generated and/or used in response to at least one of: a reception of a downlink (DL) dedicated control channel (DCCH) message that triggers a state transition, a transmission of an uplink (UL) common control channel (CCCH) message that requests a state transition, a transmission of a UL DCCH message that requests a state transition, a reception of any one DL DCCH message, a transmission of any one UL CCCH message, an indicator in a packet data convergence protocol (PDCP) header indicating usage of the first key, and an indicator in a radio resource control (RRC) message indicating usage of the first key.

The data packet generator 422 may determine and generate additional data to be transmitted during the power efficient state at a radio resource control (RRC) layer. In one example, when the additional data cannot be put in a payload, the state controller 420 may control the UE 400 to enter a time period that may be referred to as a temporary time period. The UE in the temporary time period monitors a physical downlink control channel (PDCCH) with an identification (ID) of the UE, without state transition at the RRC layer. Then, the data packet generator 422 may transmit, via the transmitter 412, the additional data while the UE 400 is in the temporary time period.

The temporary active timer controller 428 in this example can control a length of the temporary time period based on a timer. The timer may be configured based on at least one of: system information; a dedicated RRC signaling; a message in a second step of a 2-step random access channel (RACH) process; a message in a second step of a 4-step RACH process; and a message in a fourth step of a 4-step RACH process. In one example, the temporary active timer controller 428 may start the timer in response to at least one of: a first reception of the message in the second step of the 2-step RACH process, a second reception of the message in the fourth step of the 4-step RACH process, a first offset after the first reception, and a second offset after the second reception. In another example, the temporary active timer controller 428 may restart the timer upon receiving the PDCCH with the ID of the UE. In response to an expiration of the timer, the state controller 420 may control the UE 400 to exit from the temporary time period.

The PDCP count controller 429 in this example controls a packet data convergence protocol (PDCP) count value to be the same during the power efficient state based on at least one of: a first indicator in system information to indicate whether the PDCP count value shall be reset or not; and a second indicator in a dedicated RRC message to indicate whether the PDCP count value shall be reset or not.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the state controller 420. Conversely, each of the modules illustrated in FIG. 4 can be implemented using a plurality of separate components or elements.

Figure 5:
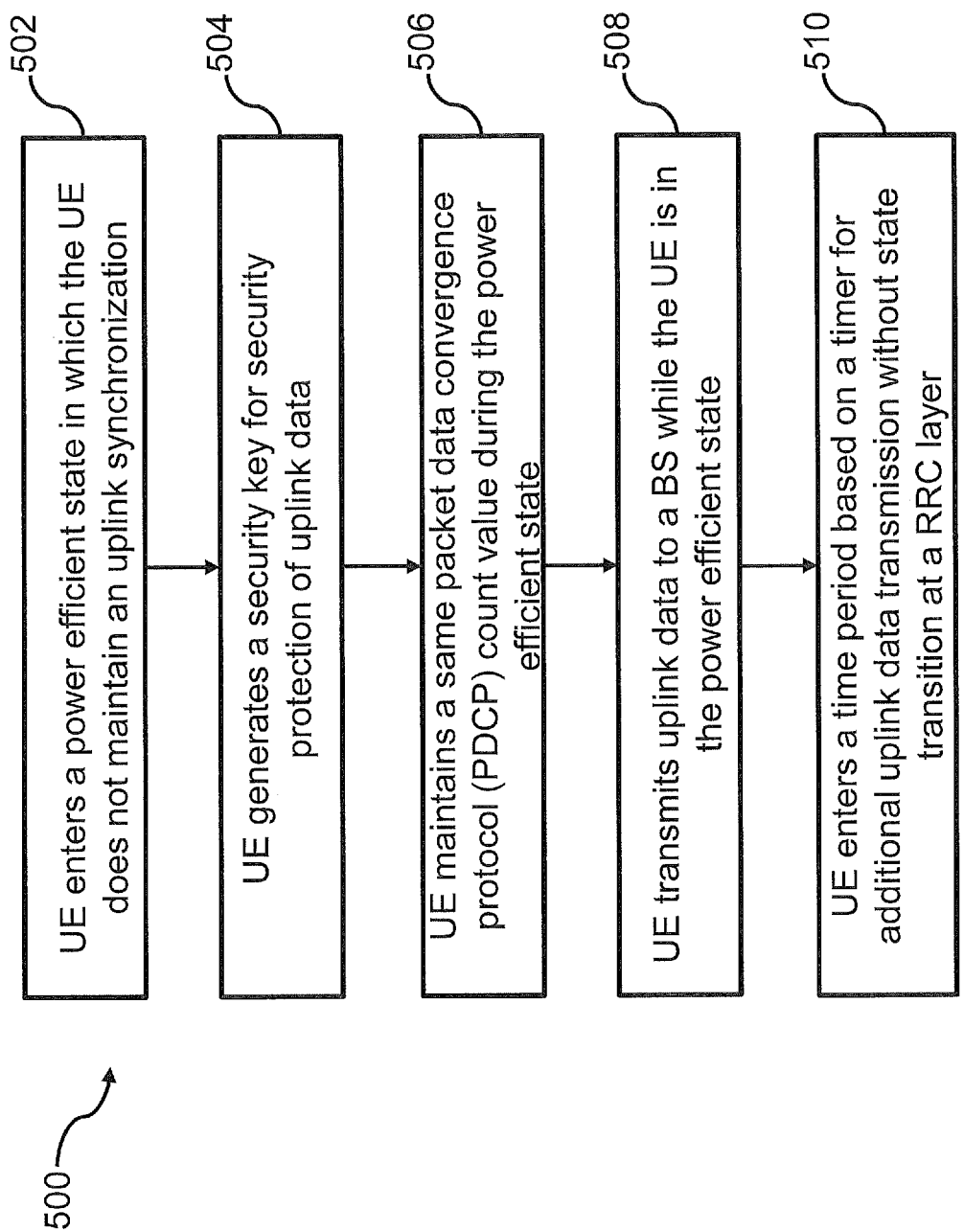
FIG. 5 illustrates a flow chart for a method performed by a UE for data transmission in a power efficient state, in accordance with some embodiments of the present disclosure.

FIG. 5 illustrates a flow chart for a method 500 performed by a UE, e.g. the UE 400 in FIG. 4, for data transmission in a power efficient state, in accordance with some embodiments of the present disclosure. At operation 502, the UE enters a power efficient state in which the UE does not need to maintain an uplink synchronization. The UE generates at operation 504 a security key for security protection of uplink data. At operation 506, the UE maintains a same packet data convergence protocol (PDCP) count value during the power efficient state. At operation 508, the UE transmits uplink data to a BS while the UE is in the power efficient state. At operation 510, the UE enters a time period based on a timer for additional uplink data transmission without state transition at a RRC layer. The time period may be referred to as a temporary time period. The order of the steps shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

According to various embodiments of the present disclosure, the following steps may be used as a baseline for data transmission in a power efficient state without state transition. In STEP 1: the UE receives a configuration for "data transmission in power efficient state without state transition" from the network side (NW) through system information and/or RRC dedicated signaling. In STEP 2: once the UE in the power efficient state has data to transmit, the UE initiates a RACH procedure or grant free transmission and includes the data packet in the payload of RACH procedure or grant free transmission for transmitting the uplink data.

In a first embodiment, since the "data transmission in power efficient state without state transition" can only be made in the cell where the "data transmission in power efficient state without state transition" is allowed (e.g. supported and allowed), the UE needs to know whether the data transmission without state transition is allowed or not in one cell. To configure this information, the following alternatives are proposed.

In Alternative 1, a per cell indicator in system information is proposed. One indicator may be included in system information to indicate whether the "data transmission in power efficient state without state transition" is allowed in the cell. The UE can only initiate the "data transmission in power efficient state without state transition" if the indicator set to be true. In one example, the indicator may be introduced in the system information. The indicator can be given per cell, per public land mobile network (PLMN) or per RAN notification area.

In Alternative 2, an area given by a cell list is proposed. A cell list can be configured to the UE through dedicated signaling, and the "data transmission in power efficient state without state transition" is allowed in the cells included in the cell list. That is, the UE is only allowed to initiate the "data transmission in power efficient state without state transition" if the cell is included in the cell list. The dedicated RRC signaling can be a signaling which is used to push the UE to the power efficient state, or a dedicated RRC signaling before the UE enters the power efficient state. In one example, a cell list may be introduced in RRC signaling to indicate in which cell the "data transmission in power efficient state without state transition" is allowed.

In Alternative 3, a per cell indicator in RAN notification area is proposed. The area scope of RAN notification area can be given by a cell list. For each cell in the cell list for RAN notification area, an indicator can be introduced to indicate whether the "data transmission in power efficient state without state transition" is allowed in that cell. In one example, an indicator may be introduced in the cell information of the cell list which is used to configure the area scope of RAN notification area. The indicator will be used to indicate whether the "data transmission in power efficient state without state transition" is allowed in that cell.

For the alternatives above, if multiple PLMNs or multiple TAs or RAN notification areas are supported in the cell, the indicator can also be given per PLMN or per TA or per RAN notification area. For all the alternatives above, either separate indicators and/or cell lists can be given for different power efficient state, or one common indicator and/or cell list can be given for one or multiple power efficient states. For example, separate indicators can be given for "data transmission in RRC_INACTIVE without state transition" and "data transmission in RRC_IDLE without state transition"; or a common indicator can be given for both RRC_INACTIVE and RRC_IDLE (i.e. the common indicator is applicable to both power efficient states).

In a second embodiment, how to determine whether the data transmission should be processed through the "data transmission without state transition" or "data transmission with state transition" (i.e. process state transition before the data transmission) is considered. Even if the "data transmission without state transition" is allowed in one cell, since the UE can initiate the data transmission with or without the state transition (e.g. from the power efficient state to the RRC_CONNECTED state), some kind of rules may be defined for the selection between the data transmission with state transition and data transmission without the state transition. To determine this, both a NW based solution and a LIE based solution can be considered.

For the UE based solution, the following rules or a combination of the following rules can be considered. A first rule is based on the buffer size of the data on UE side. To enable this, one buffer size threshold should be configured to the UE in either the system information or in dedicated signaling. The buffer size threshold can be given per UE, per logical channel, per logical channel group, per data radio bearer (DRB), per protocol data unit (PDU) session, or per quality of service (QoS) flow. Once the buffer on UE side is less (less or equal) than the threshold, the UE is allowed to initiate the "data transmission in RRC_INACTIVE without state transition"; otherwise, the UE should initiate the state transition first. For the case that the buffer size is defined per logical channel or logical channel group, if the buffer is not included for one logical channel or logical channel group, the data buffered in such logical channel or logical channel group will initiate the data transmission with state transition. That is, after triggering the state transition procedure directly, the UE will send the RRC setup request or RRC resume request message to NW to initiate the state transition. For the case that the buffer size defined per UE and the buffer size is not configured, the "data transmission in RRC_INACTIVE without state transition" is not allowed and the UE should always initiate the state transition first.

Another rule is based on the Logical channel ID (or DRB ID, QoS flow ID, PDU session ID) for which the data is available in the buffer. To enable this, one indicator per logical channel or per logical channel group or per DRB or per PDU session or per QoS flow (e.g. the indicator is used to indicate whether the data transmission without state transition is allowed for this logical channel or logical channel group, etc.) or a bitmap for logical channels or logical channel groups or DRBs or PDU sessions or QoS flows (e.g. the bitmap is used to indicate which logical channels or logical channel groups or DRBs or PDU sessions or QoS flows are allowed for the data transmission without state transition) should be configured to UE in dedicated signaling. With the indicator, once there is data buffered on UE side and all (or any) the logical channel/logical channel group/DRB/PDU session/QoS flow with data buffered is allowed to initiate the "data transmission in RRC_INACTIVE without state transition", the UE is allowed initiate the "data transmission in RRC_INACTIVE without state transition". Alternatively, with the indicator, once there is data buffered on UE side and any logical channel/logical channel group/DRB/PDU session/QoS flow with data buffered is not allowed to initiate the "data transmission in RRC_INACTIVE without state transition", the UE should initiate a state transition first.

Another rule is based on a combination of logical channel/logical channel/DRB/PDU session/QoS flow and buffer size. For example, the new rule may be based on the total buffer size of the logical channel or logical channel groups or DRB or PDU session or QoS flow, for which the data transmission without state transition is allowed, and/or a threshold.

In a NW based solution, the UE may always include the RRC message which may trigger the state transition in a payload of RACH procedure. It is up to NW to determine whether to initiate the state transition or allow the UE to process data transmission in the power efficient state or keep the UE in the power efficient state. With the RRC message, the buffer state information can be included in the payload as well. The NW can make the decision based on the buffer information.

In a third embodiment, the "payload of RACH procedure" in the above STEP 2 may be defined according to various examples. In one example, the RACH procedure mentioned above can be a 2-step RACH, a 4-step RACH or a RACH-similar process. The meaning of "payload of RACH procedure" can be one of the following: for a 2-step RACH procedure, the payload refers to the payload transmitted in message (Msg) 1 in step 1 after the preamble; for 4-step RACH procedure, the payload refers to the MAC PDU transmitted in Msg 3; for the RACH similar approach, the payload may be a payload transmitted after some kind of preamble or a payload transmitted together with DMRS.

In a fourth embodiment, information included in the payload of the RACH procedure or grant free transmission is proposed. For the RACH or RACH similar procedure, which is used to initiate the UL transmission in power efficient state, the following information can be included in the payload part. First, the payload may include I-RNTI or some other ID which can be used to identify the UE. The I-RNTI or "UE ID" may be included as MAC-CE or header/sub-header of the MAC PDU. The payload may also include a data packet. The data packet may be included as MAC SDU. For the MAC SDU, a MAC-subheader will be allocated, which includes at least a logical channel ID to indicate to which logical channel the data packet belongs.

The payload may also include a buffer status report (BSR), which may be included as a MAC CE; a power headroom report (PHR), which may be included as a MAC CE; a RRC message; and/or a data packet included in RRC message as container. The payload may also include a cause or type flag for the random access (RA) procedure, from which the NW can identify that whether the RA procedure is initiated for the data transmission without state transition. The NW may be able to identify the reason for RA procedure based on the I-RNTI. For example, if the I-RNTI is included as MAC CE, then the NW knows the RA is initiated for data transmission without state transition.

Once the payload is received by NW, the MAC entity of NW side can identify the UE based on the I-RNTI and deliver the MAC PDU to the RLC/PDCP entity based on the logical channel ID. To achieve this, a common MAC function may be required in MAC entity for the MAC PDU distribution. Once the NW detects a MAC PDU with I-RNTI MAC CE, and there is no UE context in MAC for this UE, the NW can establish a UE context in MAC for this UE.

In one embodiment, the data packet can be included either as a MAC SDU or as part of the RRC message. In one example, the data packet will be included as MAC SDU. For the MAC SDU, a MAC-subheader will be allocated, which comprises at least a logical channel ID to indicate to which logical channel the data packet belongs. In another example, the data packet will be included in one (or multiple) RRC message as a bit string or an octet string or a RRC container. For each bit string, octet string or RRC container, one (or multiple) MAC PDU, RLC PDU, PDCP PDU, SDAP PDU can be included.

In a fifth embodiment, once the payload mentioned in STEP 2 is received by NW, the NW may identify the UE based on the I-RNTI or some other "UE ID" included in the payload.

From the MAC layer, if there is UE context existing on the MAC entity, the NW can process the de-multiplex and forward the data packet to the corresponding RLC. If there is no UE context existing on MAC entity, the NW can: either buffer the data packet until the UE context is established; or forward the data packet to another NW entity where the UE context exists.

In a first example, if there is no UE context existing on NW side, the NW may buffer the packet and send an indicator to the higher layer. For example, the NW may buffer the data packet and process the data packet after the establishment of UE context; send one indication to higher layers, e.g. from MAC to higher layer like RRC, to inform the reception of data packet for one UE identified by the I-RNTI or some other UE ID. With the indication, the higher layer (e.g. RRC) may either trigger context fetch procedure to establish the context, which is up to NW's implementation, or send indication to UE to trigger the state transition first.

In a second example, if there is no UE context existing on NW side, the NW may buffer the data and send one failure indication to UE. For example, the NW may buffer the data packet and process the data packet after the establishment of UE context. One failure indication can be sent to UE though RRC message or MAC CE or physical layer command (e.g. DCI). Once the failure indication is received, the UE can initiate one state transition procedure (e.g. via a RRC Resume Request message to NW), during which the UE context will be established on NW side.

In the above two examples, one timer can be maintained on NW side. The timer can be started after the reception of the data packet. If the UE context cannot be established before the expiration of the timer, the NW may discard the buffered data.

In one example, if there is no UE context existing on NW side, the NW may discard the data packet received. The NW may send an indication to the higher layers e.g. to inform the reception of data packet for one UE identified by the UE ID; and/or send one message to UE to trigger the state transition. The message can be either a L3 RRC message or a L2 MAC CE. In another example, if there is no UE context existing on NW side, the NW may forward the packet to an anchor node, whether the UE context can be found there or not.

The NW may include DU (distributed unit) and CU (central unit). If there is UE context existing on DU, the DU can process the de-multiplex and forward the data packet to CU through the GPRS (general packet radio service) Tunneling Protocol (GTP) tunnel of the corresponding DRB. If there is no UE context existing on DU, the DU may send a message to CU to request a UE context, and buffer the data packet until the UE context is established. To enable this operation, a new signaling may be introduced in interface between the CU (e.g. where the RRC entity located) and DU (e.g. where the MAC entity located). With the new message, the following signaling procedure can be supported between CU and DU. First, the DU sends the UE context fetch request message to the CU to request the UE context. In the message, the I-RNTI or some other kind of UE ID may be included to identify the UE. Besides the ID, the data packet can be included as well or the data packet can be buffered on the DU and sent to CU after the establishment of UE context. Second, the DU receives the context establish message to establish the UE context.

If there is no UE context existing on DU, the DU may also forward the data packet to the CU through a common GTP tunnel or F1 Application Protocol (F1AP). A common GTP tunnel means a GTP tunnel that is not UE specific, but may be either cell specific or DU specific. Once the DU forwards the data packet, the following information may be forwarded together as well: I-RNTI or some other kind of UE ID; and a logical channel ID of the data packet.

In a sixth embodiment, how to process the security protection for the data transmission without state transition is considered. In current NR, the NCC (NexthopChainingCount) will be configured to UE in RRC Release message whenever the UE enters RRC_INACTIVE state. The NCC will be used to generate the new key, which will be used in the reception of RRC Resume message. However, in order to avoid frequently key update during the data transmission, the old key can still be used in the data transmission in RRC_INACTIVE, until the RRC Resume procedure is triggered, which is illustrated in FIG. 6.

Figure 6:
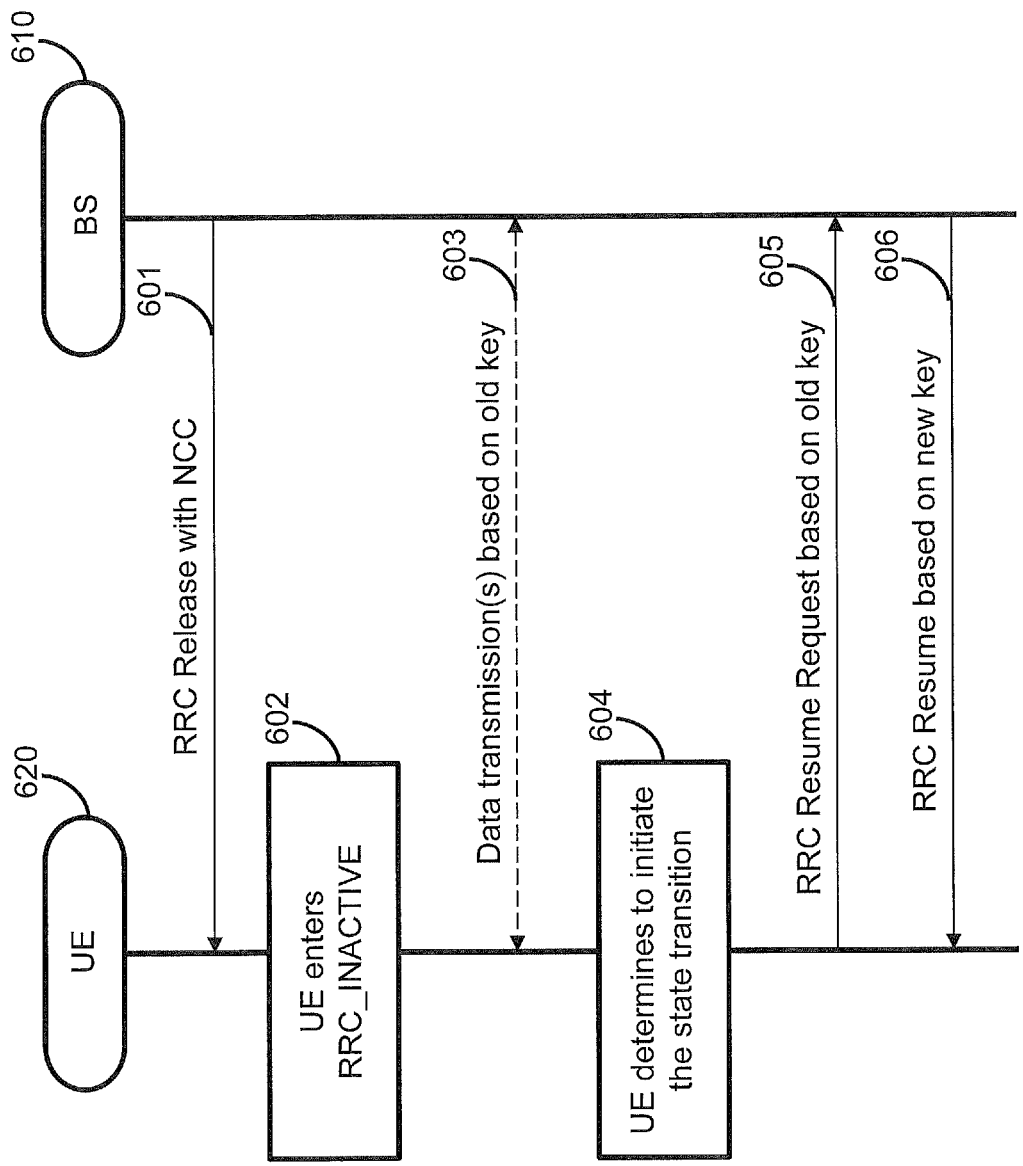
FIG. 6 illustrates an exemplary method for data transmission using a security key in a power efficient state, in accordance with an embodiment of the present disclosure.

FIG. 6 illustrates an exemplary method for data transmission using a security key in a power efficient state, in accordance with an embodiment of the present disclosure. As shown in FIG. 6, the BS 610 transmits at operation 601 the RRC Release message with NCC to the UE 620. After the UE 620 enters RRC_INACTIVE state (or another power efficient state) at operation 602, one or more data transmissions can be optionally performed at operation 603 between the BS 610 and the UE 620 based on the old key that was used before the UE 620 enters the RRC_INACTIVE state. At operation 604, the UE 620 determines to initiate the state transition. Then at operation 605, the UE 620 transmits a RRC Resume Request based on the old key to the BS 610. The BS 610 and the UE 620 may both generate the same new key independently. At the operation 606, the BS 610 transmits the RRC Resume message based on the new key to the UE 620. In this case, the old key is used by the UE from in operations 601~605 until the Resume procedure is initiated. The order of the operations shown in FIG. 6 may be changed according to different embodiments of the present disclosure. Specifically, there is no strict order between operations 604 and 605.

Therefore, for the data packet transmission in STEP 2, the security materials used by UE before the UE enters the power efficient state will be used in the security protection (i.e. integrity protection and/or ciphering) for the "data transmission in power efficient state without state transition". The security materials may include: a security key (KeNB or KgNB) and/or a security algorithm.

The UE may continue to use the security key, which is used before entering the power efficient state (e.g. RRC_INACTIVE), and switch to the new security key after any one of the following: the reception of DL DCCH message, which will trigger a state transition (e.g. RRCResume); the transmission of UL CCCH or UL DCCH message, which will request a state transition (e.g. RRCResumeRequest); the reception of one DL DCCH message; the transmission of one UL CCCH message; and an indicator carried in PDCP header or RRC message. For the UL CCCH or UL DCCH message, the new security key may be used after the message is transmitted by lower layer, after the transmission is acknowledged by lower layer (e.g. MAC or RLC), or after the contention resolution is resolved in RA procedure, during which the message is transmitted. For each of the timing points described above, one pre-configured (e.g. configurable though RRC signaling) or pre-defined (e.g. specified in protocol) offset can be added.

For the PDCP operation, the PDCP suspend operation may be performed whenever the UE enters the RRC_INACTIVE state, and the PDCP COUNT value will be reset. However, in order to support the data transmission in RRC_INACTIVE, the PDCP COUNT value should be maintained to be the same during the RRC_INACTIVE state. To achieve this, the following alternatives can be considered. In a first alternative, one indicator can be added in the RRC message, which pushes UE into the RRC_INACTIVE state to indicate whether the PDCP COUNT value shall be reset or not. The indicator can be the same indicator which is used to allow the data transmission in RRC_INACTIVE, or a separate indicator. In a second alternative, one indicator can be added in system information to indicate whether the PDCP COUNT value shall be reset or not. The indicator can be the same indicator which is used to allow the data transmission in RRC_INACTIVE, or a separate indicator. In one example, if the indicator is configured, the PDCP counter may not be reset in the PDCP suspend and/or resume procedure, or the PDCP entity may not be suspended. In another example, if the data transmission in RRC_INACTIVE is allowed, the PDCP counter may not be reset in the PDCP suspend and/or resume procedure, or the PDCP entity may not be suspended. The above operation can be applied to all the PDCP entities on UE side, or only apply to the PDCP entity, which belongs to the logical channel (or logical channel of the LCH) which is allowed for data transmission in the RRC_INACTIVE state.

In a seventh embodiment, when the payload of RACH procedure is not big enough to include all the data buffered on the UE side, the following data transmission without state transition may be considered. In one example, besides the one shot RACH/grant free transmission, the capacity provided by the "payload of Msg 1 in 2-step RACH" or "Msg 3 in 4-step RACH" or "grant free transmission" may be limited. As such, there may be some data left in the buffer, even if the data is small. Considering the possible following DL transmission (e.g. TCP acknowledgement (ACK), RLC ACK, etc.), it is better to allow the UE to enter a "temporary time period" for a short while to process the continuous monitoring of PDCCH.

In one example, the UE can only enter the "temporary time period" in case the RACH procedure is successfully completed or after the transmission through grant free resources. Within the "temporary time period", the UE can monitor the PDCCH with C-RNTI allocated during the RACH procedure, or monitor the PDCCH with I-RNTI. The monitoring of PDCCH will be made based on the configuration received in system information (e.g. CORESET, search space, etc.).

Figure 7:
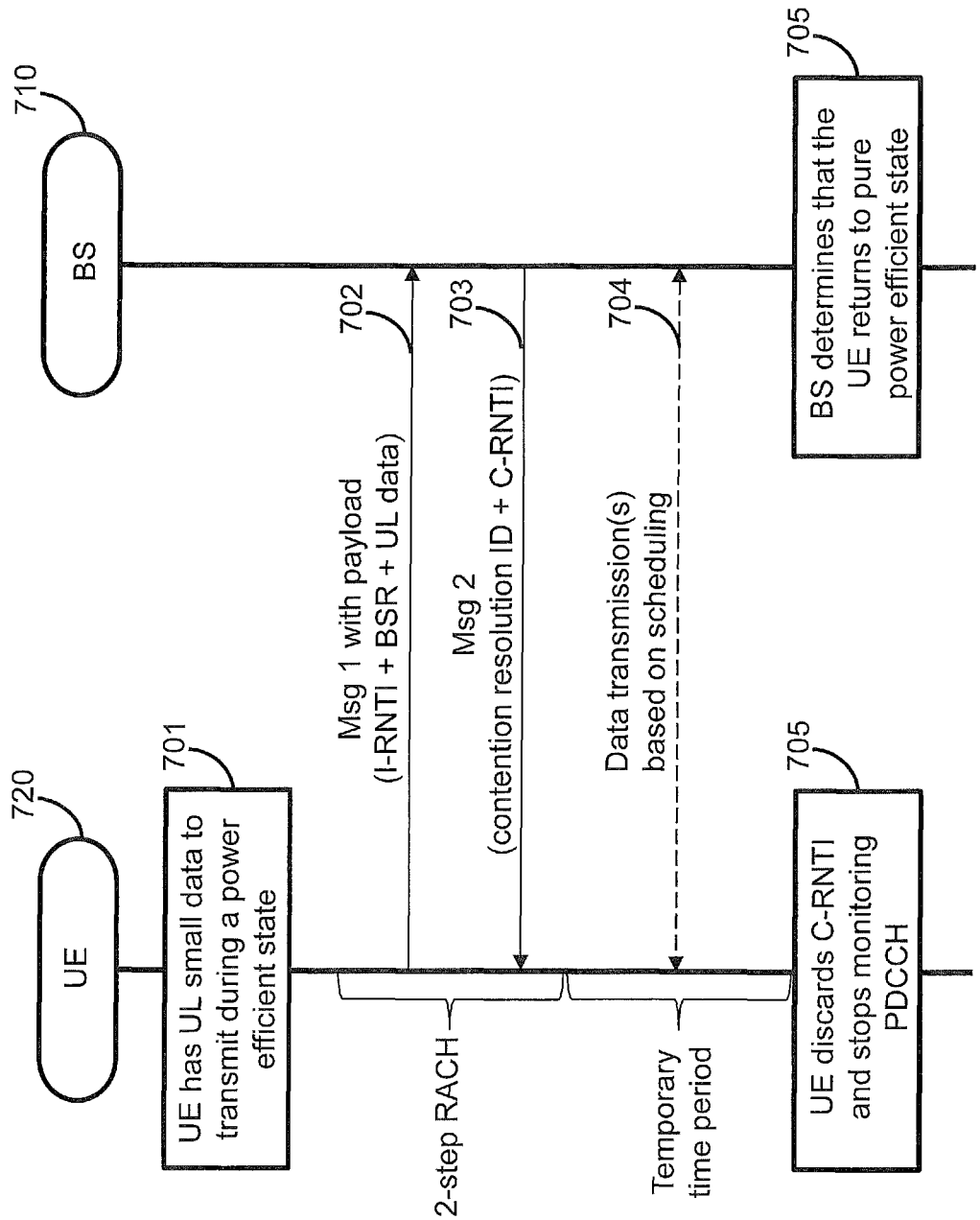
FIG. 7 illustrates an exemplary method for data transmission with a 2-step random access channel (RACH) process in a power efficient state, in accordance with an embodiment of the present disclosure.

The length of "temporary time period" can be controlled by a temporary active timer. The temporary active timer can be restart based on the PDCCH received. Once the timer expires, the UE will quit from the "temporary time period", discard the C-RNTI and enter the pure power efficient state (e.g. RRC_INACTIVE or RRC_IDLE state). A detailed procedure is illustrated in FIG. 7.

The temporary active timer can be configured to UE through the following alternatives. In Alternative 1: the temporary active timer can be included in system information. If multiple PLMNs or multiple RAN notification areas are supported in one cell, then the timer can be given per PLMN or RAN notification area. In Alternative 2: the temporary active timer can be configured through dedicated signaling. The dedicated signaling can be the dedicated signaling which pushes the UE to the power efficient state, or the dedicated signaling received by UE before the UE enters the power efficient state. The temporary active timer can be configured per UE or per logical channel or per logical channel group or per DRB or per PDU session or per QoS flow. If the timer is configured per logical channel or logical channel group or per DRB or per PDU session or per QoS flow, then the timer, associated to the logical channel or logical channel group or per PDU session or per QoS flow in which there is data available for transmission, will be used. If there are data available in multiple logical channels or logical channel groups, then the timer with larger or smaller value may be used. In Alternative 3: the temporary active timer can be configured during the RA procedure. If a 2-step RACH is used, then the temporary active timer can be carried in the Msg 2 through either a L2 signaling (e.g. MAC CE, MAC subheader or field in random access response (RAR)) or a L1 signaling (e.g. field in DCI); if a 4-step RACH is used, then the timer can be carried in the Msg 2 or Msg 4 through either a L2 signaling (e.g. MAC CE, MAC subheader or field in RAR) or a L1 signaling (e.g. field in DCI).

If the temporary active timer is not configured, the UE will not start such timer and stop monitoring the PDCCH based on C-RNTI after the successful complete of RACH procedure. That is, the UE will remain in the power efficient state after the successful complete of the RACH procedure.

The temporary active timer can be maintained in either MAC or RRC. If the temporary active timer is maintained in MAC, once the temporary active timer expires, the NW will release the UE context in MAC. For the starting of the temporary active timer, the following alternatives can be considered. In a first alternative, for 2-step RACH, the temporary active timer will be started once the corresponding Msg 2 is received, or after an offset to the time that corresponding Msg 2 is received. The offset can either be configured by NW or specified in a protocol. In a second alternative, for a 4-step RACH, the temporary active timer will be started once the corresponding Msg 4 is received, or after an offset to the time that corresponding Msg 4 is received. The offset can either be configured by NW or specified in a protocol. The "corresponding Msg 2" or "corresponding Msg 4" means the contention resolution ID or UE ID or I-RNTI of the UE is included in the Msg 2 or Msg 4. The temporary active timer may be restarted once a PDCCH with a corresponding UE ID is received. The UE ID can be C-RNTI or I-RNTI or some newly defined radio network temporary ID.

In an eighth embodiment, the content of configuration mentioned in STEP 1 is considered. Based on the description above, the configuration mentioned in STEP 1 may include the parameters identified in the first, second and/or seventh embodiments. For example, the configuration may include configuration for RA resources. Separate configurations can be provided for normal RA and RA for data transmission in INACTIVE state, including the resource in time, frequency, power (e.g. parameters related to power control), and/or code domain. The configuration may also include configuration for grant free transmission, including the resource for grant free transmission in time, frequency, power (e.g. parameters related to power control), and/or code domain. The configuration may also include indicator(s) to indicate whether the data transmission in power efficient state is supported and/or allowed. The configuration may also include configurations for the area scope regarding in which area the data transmission in power efficient state is allowed. The configuration may also include configurations for the selection between the data transmission after state transition and the data transmission in power efficient state without state transition. The configurations for the selection may include: for which Logical channel and/or logical channel group and/or DRB and/or QoS flow and/or PDU session, the data transmission in power efficient state without state transition is allowed; and the buffer size threshold, which will be used in the procedure selection.

FIG. 7 illustrates an exemplary method for data transmission with a 2-step random access channel (RACH) process in a power efficient state, in accordance with an embodiment of the present disclosure. First, the UE 720 enters a power efficient state (e.g. RRC_INACTIVE state or RRC_IDLE state), and receives and stores the configuration for "data transmission without state transition" from the BS 710, e.g. at some time before the operation 701. The configuration can be transmitted to UE 720 through either system information or dedicated RRC signaling. Then at operation 701, the UE 720 in the power efficient state determines to initiate the "data transmission without state transition" based on the configuration.

At operation 702, the UE 720 initiates a 2-step RACH procedure. In the 2-step RACH procedure, the UE 720 includes the I-RNTI, uplink data packet and/or buffer status report (BSR) in the payload part of Msg 1. Then at operation 703, the UE 720 receives the corresponding Msg 2 from the BS 710. Upon receiving the corresponding Msg 2, the UE 720 starts the temporary active timer if it is configured, and monitors the PDCCH based on the C-RNTI (or I-RNTI or some newly defined radio network temporary ID) until the expiration of the timer. In the meantime, one or more data transmissions can be optionally performed at operation 704 based on scheduling. While the timer is running, the UE 720 is in a temporary time period. If the temporary active timer is not configured, the UE 720 will stop the monitoring of the PDCCH based on the C-RNTI (or I-RNTI or some newly defined radio network temporary Ill), and end the procedure.

Once the timer expires, the UE 720 discards at operation 705 the C-RNTI or newly defined radio network temporary Ill which is received in Msg 2 and stops the PDCCH monitoring with C-RNTI. The BS 710 also monitors the timer. Once the timer expires, the BS 710 determines at operation 705 that the UE 720 exits from the temporary time period and returns to a pure power efficient state. If the UE 720 has more data (or newly arrival data) to transmit after the operation 705, and the UE 720 determines to process "data transmission without state transition", operations 702~705 may be repeated. The order of some operations shown in FIG. 7 may be changed according to different embodiments of the present disclosure.

Figure 8:
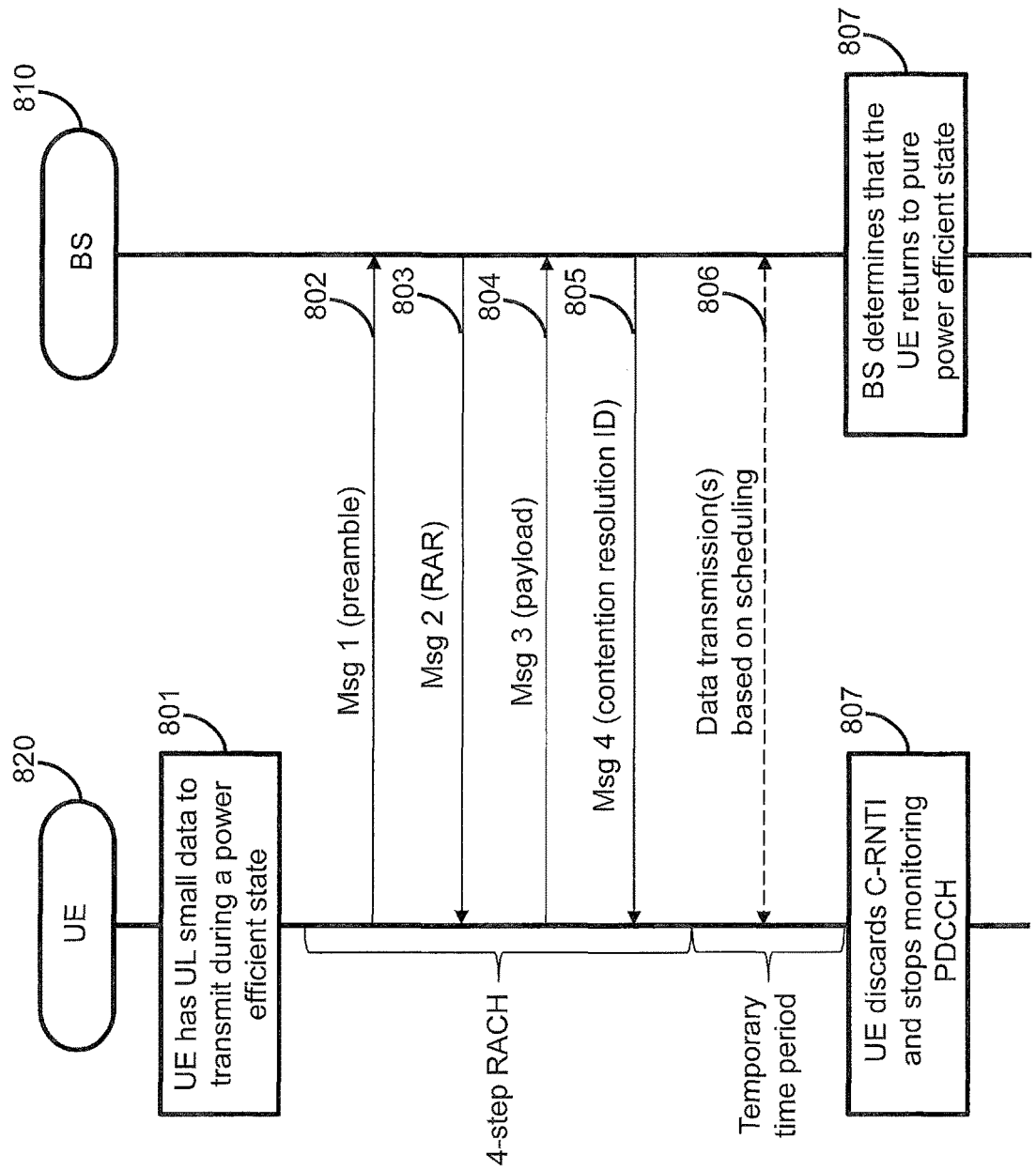
FIG. 8 illustrates an exemplary method for data transmission with a 4-step RACH process in a power efficient state, in accordance with an embodiment of the present disclosure.

FIG. 8 illustrates an exemplary method for data transmission with a 4-step RACH process in a power efficient state, in accordance with an embodiment of the present disclosure.

First, the UE 820 enters a power efficient state (e.g. RRC_INACTIVE state or RRC_IDLE state), and receives and stores the configuration for "data transmission without state transition" from the BS 810, e.g. at some time before the operation 801. The configuration can be transmitted to UE 820 through either system information or dedicated RRC signaling. Then at operation 801, the UE 820 in the power efficient state determines to initiate the "data transmission without state transition" based on the configuration.

At operation 802, the UE 820 initiates a 4-step RACH procedure and transmits a preamble in Msg 1 to the BS 810. Then at operation 803, the UE 820 receives the corresponding Msg 2 from the BS 810. In the 4-step RACH procedure, the UE 820 includes the I-RNTI, uplink data packet and/or buffer status report (BSR) in the payload part of Msg 3 that is transmitted at operation 804 to the BS 810. At operation 805, the UE 820 receives the corresponding Msg 4 from the BS 810. Upon receiving the corresponding Msg 4, the UE 820 starts the temporary active timer if it is configured, and monitors the PDCCH based on the C-RNTI (or I-RNTI or some newly defined radio network temporary ID) until the expiration of the timer. In the meantime, one or more data transmissions can be optionally performed at operation 806 based on scheduling. While the timer is running, the UE 820 is in a temporary time period. If the temporary active timer is not configured, the UE 820 will stop the monitoring of the PDCCH based on the C-RNTI (or I-RNTI or some newly defined radio network temporary ID), and end the procedure.

Once the timer expires, the UE 820 discards at operation 807 the C-RNTI or newly defined radio network temporary ID which is received in Msg 2 and stops the PDCCH monitoring with C-RNTI. The BS 810 also monitors the timer. Once the timer expires, the BS 810 determines at operation 807 that the UE 820 exits from the temporary time period and returns to a pure power efficient state. If the UE 820 has more data (or newly arrival data) to transmit after the operation 807, and the UE 820 determines to process "data transmission without state transition", operations 802~807 may be repeated. The order of some operations shown in FIG. 8 may be changed according to different embodiments of the present disclosure.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
    entering a power efficient state, wherein the wireless communication device does not maintain an uplink synchronization in the power efficient state;
    determining, whether data transmission in the power efficient state without state transition is allowed for each of a plurality of logical channels based on a respective one of a first plurality of indicators; and
    transmitting, to a wireless communication node, uplink data while being in the power efficient state.

2. The method of claim 1, wherein the power efficient state further comprises at least one of:
    an inactive state;
    an idle state; and
    a state in which the wireless communication device does not monitor a physical downlink control channel (PDCCH) based on a cell radio network temporary identifier (C-RNTI).

3. The method of claim 1, further comprising:
    receiving, from the wireless communication node, configuration information related to the power efficient state, through at least one of: system information and a dedicated radio resource control (RRC) signaling.

4. The method of claim 3, wherein the configuration information comprises information related to at least one of:
    configuration for random access resources;
    configuration for grant free transmission;
    an indicator indicating whether data transmission in the power efficient state is supported and/or allowed;
    configuration, for an area scope including a plurality of cells, regarding whether data transmission in the power efficient state is supported and/or allowed in each of the plurality of cells; and
    configuration related to a selection between data transmission after state transition and data transmission in the power efficient state without state transition.

5. The method of claim 1, further comprising determining that data transmission in the power efficient state without state transition is allowed based on at least one of:

a first indicator in system information to indicate whether data transmission in the power efficient state without state transition is allowed in a cell;
a second indicator in a dedicated signaling to indicate a cell list including at least one cell in which data transmission in the power efficient state without state transition is allowed;
a third indicator to indicate whether data transmission in the power efficient state without state transition is allowed in a public land mobile network;
a fourth indicator to indicate whether data transmission in the power efficient state without state transition is allowed in a tracking area;
a fifth indicator to indicate whether data transmission in the power efficient state without state transition is allowed in a radio access network (RAN) notification area; or
a second plurality of indicators each of which corresponds to one of a plurality of cells in an area scope, wherein each of the second plurality of indicators indicates whether data transmission in the power efficient state is allowed in a corresponding cell.

6. The method of claim 1, further comprising determining that data transmission in the power efficient state without state transition is allowed based on at least one of:
a separate indicator related to the power efficient state; and
a common indicator related to a plurality of power efficient states comprising the power efficient state.

7. The method of claim 1, further comprising determining to maintain the power efficient state while transmitting the uplink data based on at least one of:
a second buffer size of the uplink data is less than a second threshold;
the uplink data is related to a type of service for which data transmission in the power efficient state without state transition is allowed or not allowed, wherein the type of service refers to at least one of: a data radio bearer (DRB), a protocol data unit (PDU) session, or a quality of service (QOS) flow;
a total buffer size of data related to at least one type of service for which the data transmission without state transition is allowed is less than a third threshold; and
an indication from the wireless communication node.

8. A method performed by a wireless communication node, the method comprising:
determining, whether data transmission in a power efficient state without state transition is allowed for each of a plurality of logical channels based on a respective one of a first plurality of indicators; and
receiving, from a wireless communication device, uplink data while the wireless communication device is in the power efficient state, wherein the wireless communication node configures the power efficient state such that the wireless communication device does not maintain an uplink synchronization in the power efficient state.

9. The method of claim 8, wherein the power efficient state further comprises at least one of:
an inactive state;
an idle state; and
a state in which the wireless communication device does not monitor a physical downlink control channel (PDCCH) based on a cell radio network temporary identifier (C-RNTI).

10. The method of claim 8, further comprising transmitting, to the wireless communication device, configuration information related to the power efficient state, through at least one of: system information and a dedicated radio resource control (RRC) signaling, wherein the configuration information comprises information related to at least one of:
configuration for random access resources;
configuration for grant free transmission;
an indicator indicating whether data transmission in the power efficient state is supported and/or allowed;
configuration, for an area scope including a plurality of cells, regarding whether data transmission in the power efficient state is supported and/or allowed in each of the plurality of cells; and
configuration related to a selection between data transmission after state transition and data transmission in the power efficient state without state transition.

11. The method of claim 8, further comprising configuring that data transmission in the power efficient state without state transition is allowed based on at least one of:
a first indicator in system information to indicate whether data transmission in the power efficient state without state transition is allowed in a cell;
a second indicator in a dedicated signaling to indicate a cell list including at least one cell in which data transmission in the power efficient state without state transition is allowed;
a third indicator to indicate whether data transmission in the power efficient state without state transition is allowed in a public land mobile network;
a fourth indicator to indicate whether data transmission in the power efficient state without state transition is allowed in a tracking area;
a fifth indicator to indicate whether data transmission in the power efficient state without state transition is allowed in a radio access network (RAN) notification area;
a second plurality of indicators each of which corresponds to one of a plurality of cells in an area scope, wherein each of the second plurality of indicators indicates whether data transmission in the power efficient state is allowed in a corresponding cell;
a separate indicator related to the power efficient state; and
a common indicator related to a plurality of power efficient states comprising the power efficient state.

12. The method of claim 8, further comprising determining to keep the wireless communication device in the power efficient state during transmission of the uplink data based on at least one of:
a second buffer size of the uplink data is less than a second threshold;
the uplink data is related to a type of service for which data transmission in the power efficient state without state transition is allowed or not allowed, wherein the type of service refers to at least one of: a data radio bearer (DRB), a protocol data unit (PDU) session, or a quality of service (QOS) flow;
a total buffer size of data related to at least one type of service for which the data transmission without state transition is allowed is less than a third threshold; and
an indication to the wireless communication device.

13. The method of claim 8, wherein the uplink data is received based on at least one of:
a grant free transmission; and
a payload of a random access process to the wireless communication node.

14. The method of claim 13, wherein the payload refers to at least one of:

a payload transmitted after a preamble in a first step of a 2-step random access channel (RACH) process;

a medium access control (MAC) protocol data unit (PDU) transmitted in a message in a third step of a 4-step RACH process;

a payload transmitted after a preamble in a process similar to RACH; and a payload transmitted together with a demodulation reference signal (DMRS).

15. A wireless communication device comprising:

at least one processor configured to place the wireless communication device in a power efficient state, wherein the wireless communication device does not maintain an uplink synchronization in the power efficient state, and wherein the at least one processor determines whether data transmission in the power efficient state without state transition is allowed for each of a plurality of logical channels based on a respective one of a first plurality of indicators; and a transceiver configured to transmit to a wireless communication node uplink data while being in the power efficient state.

16. The wireless communication device of claim 15, wherein the power efficient state further comprises at least one of:

an inactive state;

an idle state; and a state in which the wireless communication device does not monitor a physical downlink control channel (PDCCH) based on a cell radio network temporary identifier (C-RNTI).

17. The wireless communication device of claim 15, wherein the transceiver is further configured to receive, from the wireless communication node, configuration information related to the power efficient state, through at least one of: system information and a dedicated radio resource control (RRC) signaling.

18. The wireless communication device of claim 17, wherein the configuration information comprises information related to at least one of:

configuration for random access resources;

configuration for grant free transmission;

an indicator indicating whether data transmission in the power efficient state is supported and/or allowed;

configuration, for an area scope including a plurality of cells, regarding whether data transmission in the power efficient state is supported and/or allowed in each of the plurality of cells; and configuration related to a selection between data transmission after state transition and data transmission in the power efficient state without state transition.

19. The wireless communication device of claim 15, wherein the at least one processor is further configured to determine that data transmission in the power efficient state without state transition is allowed based on at least one of:

a first indicator in system information to indicate whether data transmission in the power efficient state without state transition is allowed in a cell;

a second indicator in a dedicated signaling to indicate a cell list including at least one cell in which data transmission in the power efficient state without state transition is allowed;

a third indicator to indicate whether data transmission in the power efficient state without state transition is allowed in a public land mobile network;

a fourth indicator to indicate whether data transmission in the power efficient state without state transition is allowed in a tracking area;

a fifth indicator to indicate whether data transmission in the power efficient state without state transition is allowed in a radio access network (RAN) notification area;

a second plurality of indicators each of which corresponds to one of a plurality of cells in an area scope, wherein each of the second plurality of indicators indicates whether data transmission in the power efficient state is allowed in a corresponding cell;

a separate indicator related to the power efficient state; and a common indicator related to a plurality of power efficient states comprising the power efficient state.

20. The wireless communication device of claim 15, wherein the at least one processor is further configured to determine to maintain the power efficient state while transmitting the uplink data based on at least one of:

a second buffer size of the uplink data is less than a second threshold;

the uplink data is related to a type of service for which data transmission in the power efficient state without state transition is allowed or not allowed, wherein the type of service refers to at least one of: a data radio bearer (DRB), a protocol data unit (PDU) session, or a quality of service (QOS) flow;

a total buffer size of data related to at least one type of service for which the data transmission without state transition is allowed is less than a third threshold; and an indication from the wireless communication node.

* * * * *